US008537377B2

(12) United States Patent
Burkland

(10) Patent No.: US 8,537,377 B2
(45) Date of Patent: Sep. 17, 2013

(54) ABSOLUTE POSITION ENCODER

(75) Inventor: Michael K. Burkland, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 231 days.

(21) Appl. No.: 13/094,970

(22) Filed: Apr. 27, 2011

(65) Prior Publication Data

US 2012/0274948 A1 Nov. 1, 2012

(51) Int. Cl.
*G01B 11/14* (2006.01)

(52) U.S. Cl.
USPC .......................... 356/616; 356/614; 356/622

(58) Field of Classification Search
USPC ..... 356/237.1–241.6, 242.1–243.8, 426–431, 356/600–640
See application file for complete search history.

(56) References Cited

U.S. PATENT DOCUMENTS

| | | | |
|---|---|---|---|
| 4,621,256 A * | 11/1986 | Rusk | 341/3 |
| 4,677,293 A | 6/1987 | Michel | |
| 4,874,941 A | 10/1989 | Spillman Jr. | |
| 4,956,553 A | 9/1990 | Matsui | |
| 4,985,624 A | 1/1991 | Spillman, Jr. | |
| 4,987,299 A | 1/1991 | Kobayashi et al. | |
| 5,010,655 A | 4/1991 | Rieder et al. | |
| 5,012,090 A | 4/1991 | Spillman, Jr. | |
| 5,148,019 A | 9/1992 | Kobayashi et al. | |
| 5,159,192 A | 10/1992 | Nishimura et al. | |
| 5,283,690 A | 2/1994 | Miyake et al. | |
| 5,319,445 A | 6/1994 | Fitts | |
| 5,349,183 A | 9/1994 | Barkhoudarian | |
| 5,351,321 A | 9/1994 | Snitzer et al. | |
| 5,380,995 A | 1/1995 | Udd et al. | |
| 5,428,472 A | 6/1995 | Miyake et al. | |
| 5,646,730 A * | 7/1997 | Mitchell et al. | 356/499 |

(Continued)

FOREIGN PATENT DOCUMENTS

| | | |
|---|---|---|
| EP | 0389093 A2 | 9/1990 |
| WO | 01/20372 A2 | 3/2001 |

OTHER PUBLICATIONS

Donald J. Michels, Change of blaze wavelength as a function of position on the surface of a concave grating, Journal of the Optical Society of America, vol. 64, No. 5 May 1974.
Encoder Application Handbook, Danaher Industrial Controls, 1675 Delany Road, Gurnee, IL 60031, pp. 1-15.
Dynapar Feedback Devices 2006 Product Catalog.

(Continued)

*Primary Examiner* — Gregory J Toatley
*Assistant Examiner* — Jarreas C Underwood
(74) *Attorney, Agent, or Firm* — Eric A. Gifford

(57) ABSTRACT

In an absolute position encoder, a multi-spectral light source illuminates a position on a topographic surface at an angle of incidence determined from a vector normal to the surface. A target on, and positionally-registered to, the topographic surface comprises a variable grating that diffracts the incident light to form a multi-spectral diffraction pattern in which the angular dispersion of the diffraction pattern varies with the absolute position of the incident light along the grating. A chromatically responsive sensor detects a narrow band of the diffraction pattern through an entrance aperture positioned at an angle of detection determined from the vector normal to the topographic surface and outputs a signal responsive to the change in the angular dispersion of the detected narrow band of the diffraction pattern. The source/sensor unit maintains (within an acceptable noise tolerance) its geometric relationship to the vector normal to the topographic surface at the position of illumination. A processing element uses a system transfer function to map the detected signal to an absolute-position on the topographic surface.

18 Claims, 12 Drawing Sheets

(56) References Cited

U.S. PATENT DOCUMENTS

| | | | |
|---|---|---|---|
| 5,757,497 | A | 5/1998 | Hill et al. |
| 5,760,391 | A | 6/1998 | Narendran |
| 6,366,047 | B1 * | 4/2002 | Horwitz et al. ............... 318/602 |
| 6,693,745 | B1 | 2/2004 | Kondis et al. |
| 7,138,620 | B2 | 11/2006 | Trisnadi et al. |
| 7,557,799 | B2 * | 7/2009 | Baer et al. .................... 345/166 |
| 7,638,755 | B2 * | 12/2009 | Ayres et al. ............. 250/231.13 |
| 2004/0173735 | A1 | 9/2004 | Williams et al. |

OTHER PUBLICATIONS

Gurley Precision Instruments, Model VL18 Virtual Absolute Linear Encoder, 514 Fulton St • Troy, NY 12181 pp. 1-6.

Gordon et al., Virtual Absolute Technology, 1998-2002 Gurley Precision Instruments.

Avago Technolgies, AEDR-8400 Services Reflective Surface Mount Optical Encoder Data Sheet, Apr. 18, 2007, pp. 1-8.

Gurley Series VL18 Virtual Absolute Encoder, Gurley Precision Instruments 514 Fulton Street, Troy, NY 12180 U.S.A., pp. 1-5.

* cited by examiner

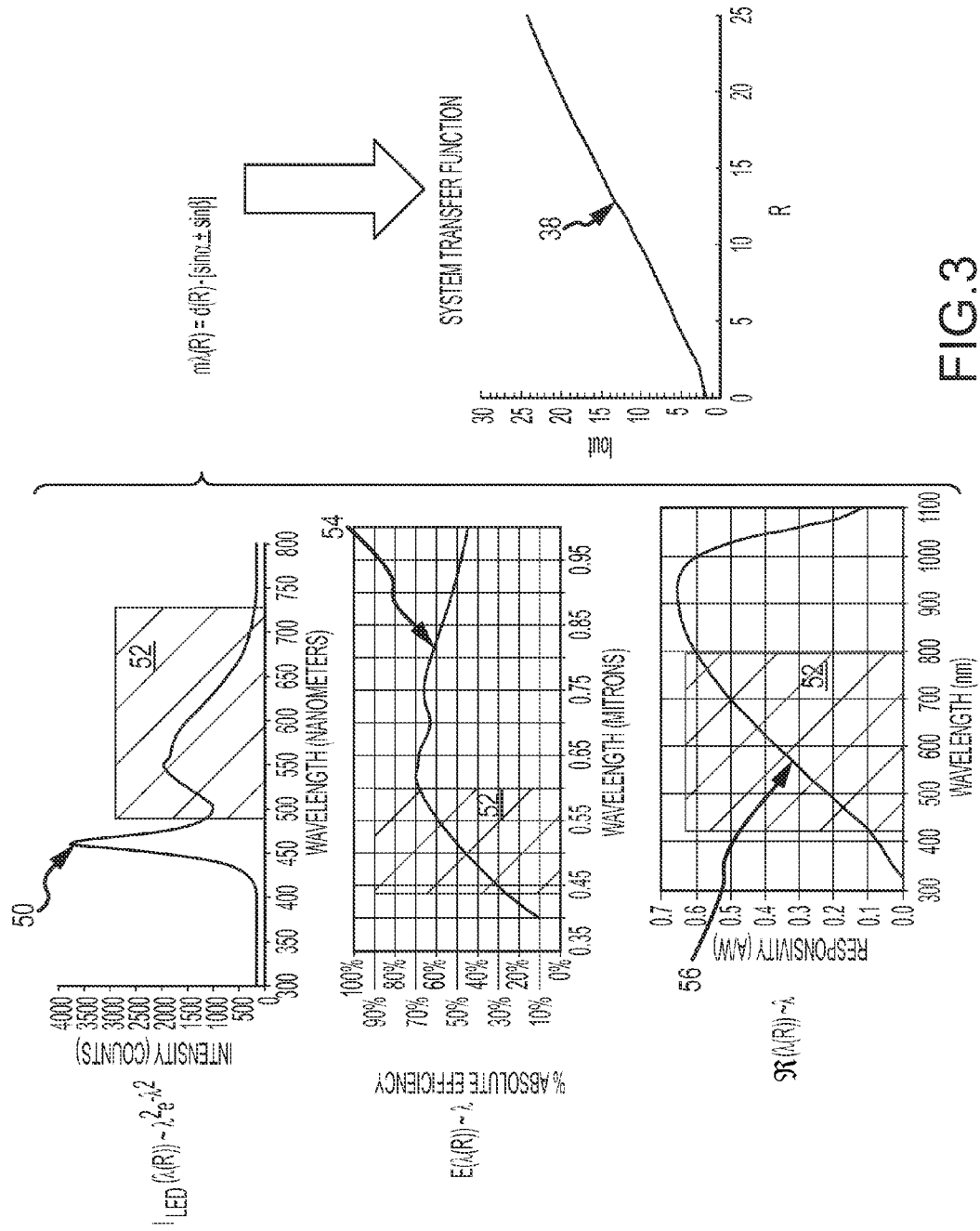

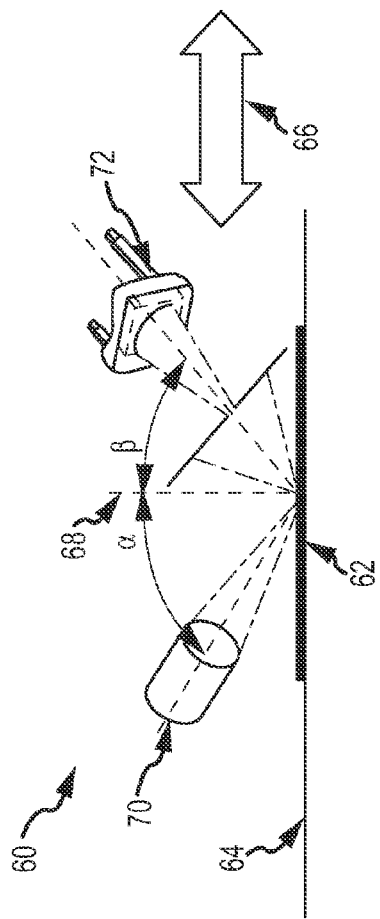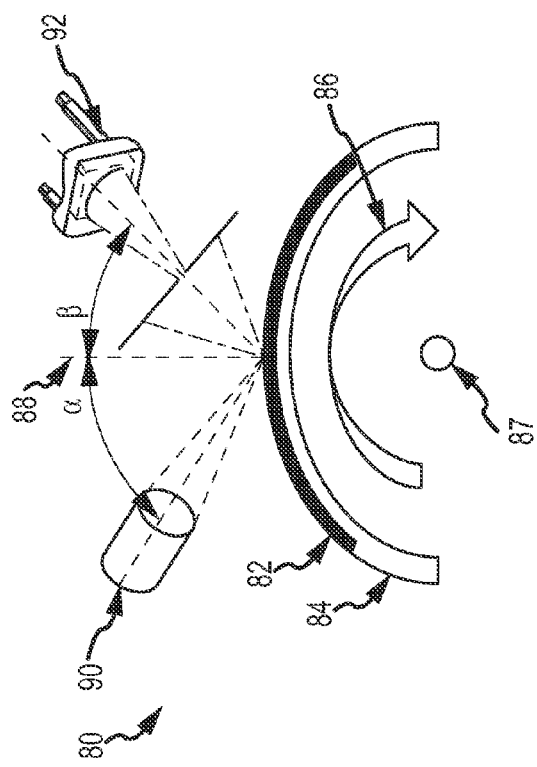
FIG.4a
FIG.4b

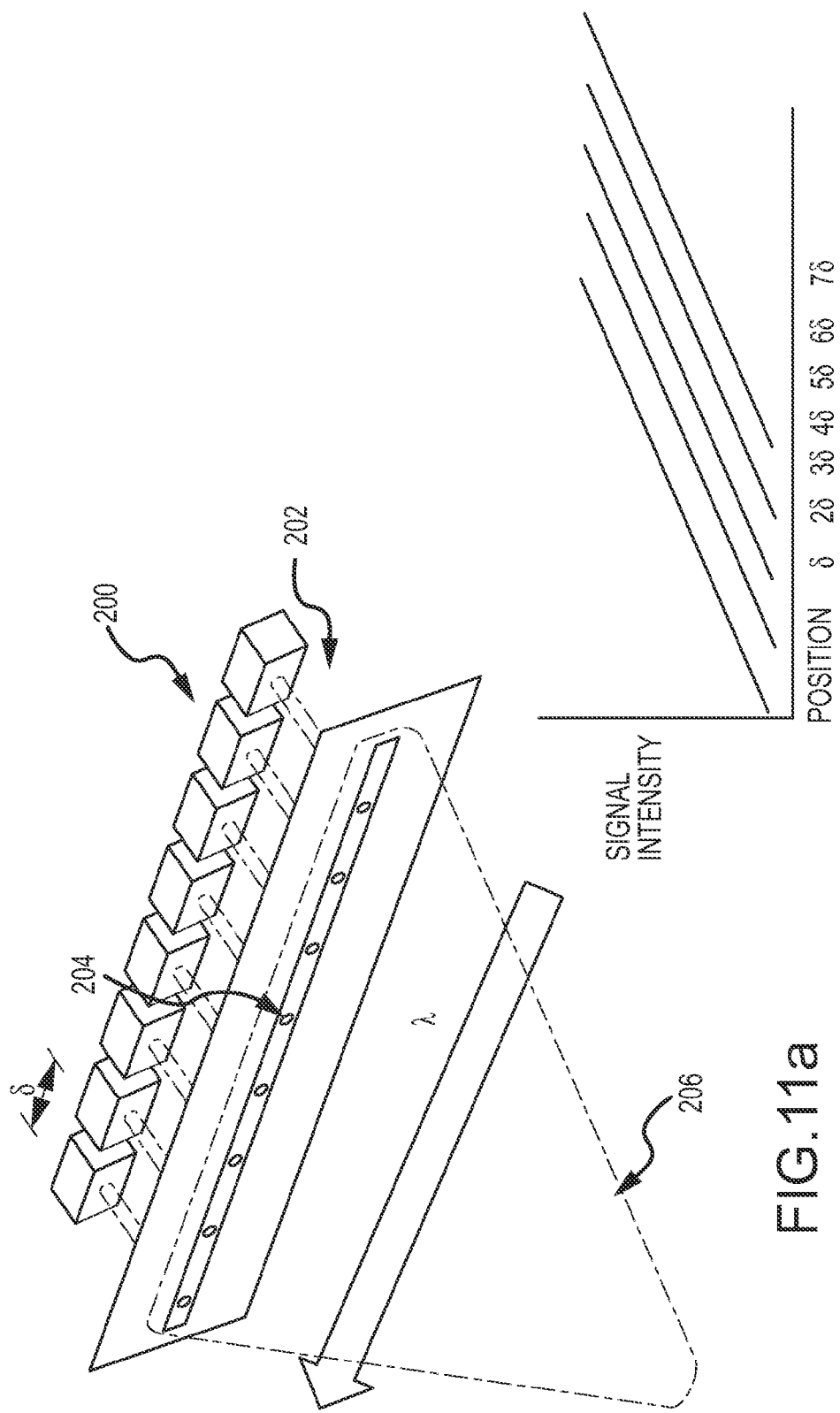

ABSOLUTE POSITION ENCODER

GOVERNMENT RIGHTS

This invention was made with United States Government support under Contract Number W15QKN-08-C-0054 with the United States Army. The United States Government has certain rights in this invention.

BACKGROUND OF THE INVENTION

1. Field of the Invention

This invention relates to an encoder for detecting the absolute position on a topographic surface of an element.

2. Description of the Related Art

Position encoders are used to accurately determine a position on a surface of an element of a device or system. Position encoders may measure relative or absolute position. A relative position encoder provides position information indicating the change from a prior position, while an absolute position encoder provides absolute position information indicating a specific position regardless of prior position. Position encoders are used in automated manufacturing, gimbaled systems, and elsewhere when accurate positional information is desired. In gimbaled-camera systems, for example, absolute position encoders may be used for accurate line-of-sight reconstruction in guidance.

Some conventional position encoders place encoder tracks (patterns of alternating dark and light surfaces) on the surface of the element. Detectors sense light reflected off the pattern due to relative motion of the element and detector. A simple count of the alternating pattern may provide relative motion. Absolute position may be determined via an initial calibration.

Some position encoders use separate encoder tracks for each bit of a Grey code, in which only one bit of the code changes at a time. Detectors are used to detect which bit changes to determine a position. One problem with this arrangement is that higher resolution requires a high number of separate encoder tracks. Another problem is that this arrangement is highly sensitive to contamination, which results in erroneous position information.

U.S. patent pub. No. 2004/0173735 entitled "Absolute Incremental Position Encoder and Method" describes a position encoder that detects bit-width transitions from a sequence having a plurality of unique subsequences. In embodiments, the position encoder may use a single track encoded with a pattern of bit-widths in accordance with the sequence. The sequence may be a pseudo-random noise (PRN) sequence or other sequence having unique subsequences. In one embodiment, sensors detect transitions between the bit-widths as the track moves to provide in-phase and quadrature-phase pick-off signals. When a PRN sequence is used having a length of $2^N$ bits, the position of the track may be an absolute position when the number of transitions between the bit-widths detected by the sensors is at least N. The position may be an incremental position when the number of transitions between bit-widths detected by the sensors is less than N. In one embodiment, each bit-width encoded on the track has either a first width or a second width determined by the sequence. The first width may represent the "ones" in the sequence and the second width may represent the "zeroes" in the sequence. The pattern on the track may be a pattern of alternating dark and light portions having the bit-widths encoded in accordance with bits of the sequence, and the first- and second sensors may be optical sensors positioned to have overlapping fields of view.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an encoder for detecting the absolute position on a topographic surface. This encoder does not require initialization and may be used to detect absolute position on a topographic surface having an arbitrary base curvature and multiple degrees of freedom of motion relative to the encoder.

This is accomplished with a multi-spectral light source that illuminates a position on a topographic surface of an element at an angle of incidence determined from a vector normal to the surface. A target on, and positionally-registered to, the topographic surface comprises a variable grating that diffracts the incident light to form a multi-spectral diffraction pattern in which the angular dispersion of the diffraction pattern varies with the absolute position of the incident light along the grating. A chromatically responsive sensor detects a narrow band of the diffraction pattern through an entrance aperture (e.g. a pinhole) positioned at an angle of detection determined from the vector normal to the topographic surface. The sensor outputs a signal responsive to the change in the angular dispersion of the detected narrow band of the diffraction pattern. A system transfer function of the source, target and sensor for a fixed angle of incidence and fixed angle of detection to the vector normal to the surface provides a 1-to-1 mapping of the detected signal to absolute position on the grating, hence topographic surface. The source/sensor unit maintains (within an acceptable noise tolerance) its geometric relationship to the vector normal to the topographic surface at the position of illumination. A processing element uses the system transfer function to map the detected signal to an absolute-position on the topographic surface. The sensitivity may be increased by using a linear array of identical detectors and supplementing the reading of a detector by a phase quadrature reading from each pair of detectors.

A grating, transmissive or reflective, is characterized by a variation in its geometric or material properties that produces a spatial periodic modulation in the index of refraction that diffracts the incident light to create the multi-spectral diffraction pattern. These geometric or material properties may be controlled to vary the spatial periodic modulation of the index of refraction such that the angular dispersion of the diffraction pattern varies with the absolute position of illumination along the variable grating. This may be accomplished by varying the surface relief, index of refraction or optical absorption of the optical materials that make up the grating. A blazed grating in which the blaze angle of the facet changes over the length of the grating is one example of a variation in surface relief. The geometric or material properties may be varied in a monotonic, and possibly linear, manner to vary the angular dispersion.

In an embodiment, the topographic surface of the element, hence the variable grating, may have an arbitrary topology. The surface may be flat or curved. Curved surfaces may have a constant radius of curvature (e.g. a sphere) or a varying radius of curvature. The topology should be "smoothly varying" (if at all) such that the geometric relationship of the source/sensor unit to the vector normal to the surface at the point of illumination remains approximately constant. In some cases, the geometric relationship of the source/sensor unit is fixed based on a constant vector normal at the point of illumination such as a planar surface with linear relative motion or a spherical surface with rotation relative motion. In other cases, the geometric relationship of the source/sensor unit adapts to changes in the vector normal with relative motion to maintain the approximately constant relationship.

In an embodiment, the encoder is configured to measure absolute-position on the surface for a single degree of freedom of relative motion. The grating is positioned orthogonal to the direction of motion. The grating parameter varies along the direction of motion. The source/sensor unit is positioned so that the direction of motion lies in the plane of the incident and diffracted light.

In an embodiment, the encoder is configured to measure absolute-position on the surface for multiple degrees of freedom of coupled relative motion. A source/sensor unit and target are provided for each of the degrees of freedom. In a "coupled" system, the absolute position for a given degree of freedom is represented by the combined outputs of the multiple sensors. The processing element(s) apply known techniques to the detected signals to measure the absolute position for each degree of freedom. In a "decoupled" system, each source/sensor unit and target outputs the absolute position for a particular degree of freedom. This can be achieved either by positioning the gratings co-orthogonal to one another and orthogonal to their respective degrees of freedom or by shaping the gratings so that motion along the measured degree of freedom remains orthogonal to the grating.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a diagram of the transfer functions of the encoder's multi-spectral light source, variable diffraction grating and chromatically sensitive sensor that combine into a monotonic system transfer function that relates detected signal to absolute-position;

FIGS. 4a through 4c are diagrams of various embodiments in which the geometric relationship of the source/sensor to the vector normal to the surface is maintained with relative motion;

FIGS. 11a and 11b are diagrams of an embodiment of the chromatically responsive sensor comprising linear array of identical detectors in which the positional reading of each detector is supplemented by a phase quadrature reading from each pair of detectors.

DETAILED DESCRIPTION OF THE INVENTION

The present invention provides an encoder for detecting the absolute position on a topographic surface. This encoder does not require initialization and may be used to detect absolute position on a topographic surface having an arbitrary base curvature and multiple degrees of freedom of motion relative to the encoder. The encoder measures angular dispersion from a "target" comprising a variable grating on and positionally-registered to the topographic surface to determine absolute position.

Figure 1:
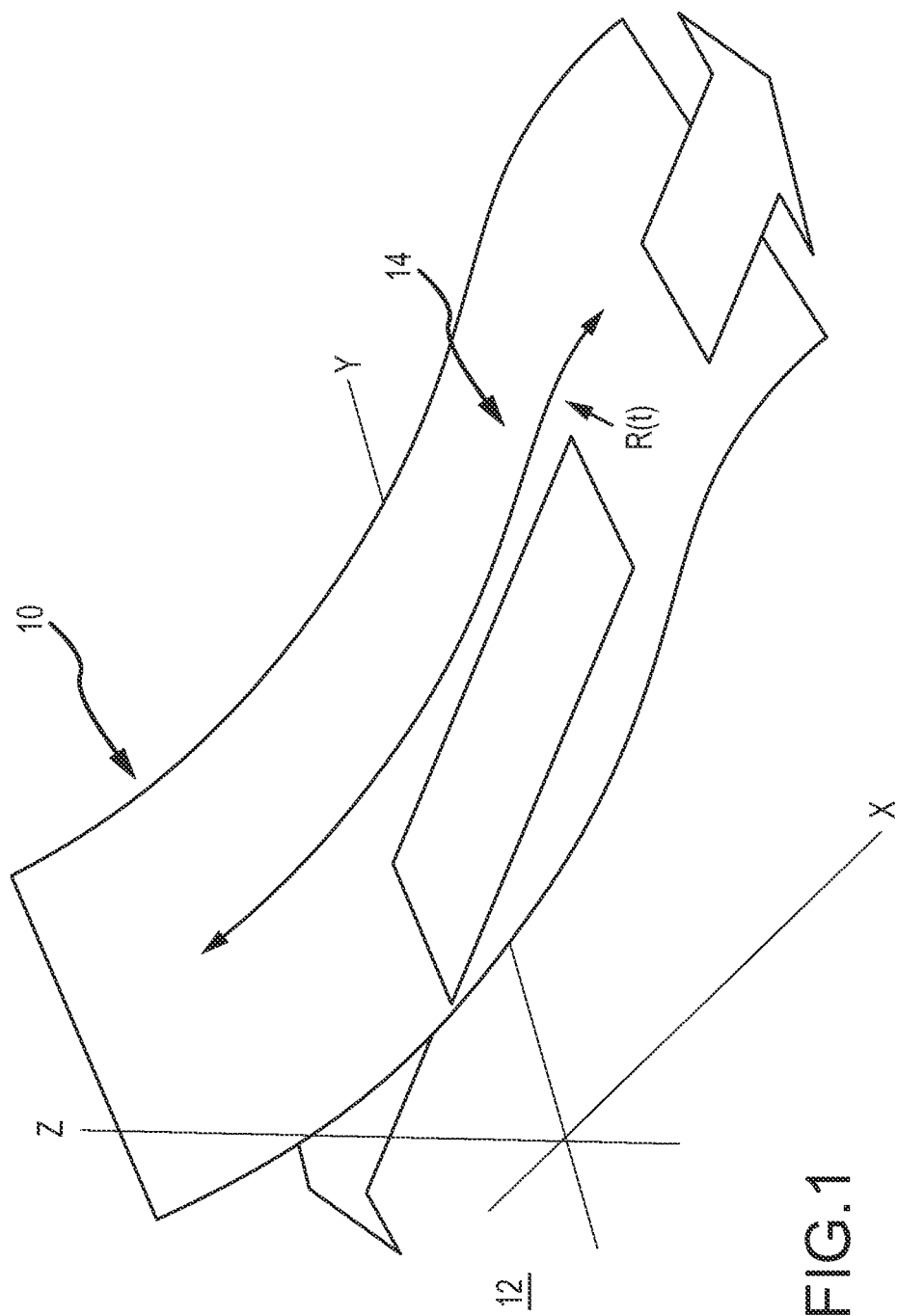
FIG. 1 is a diagram of a non-planar topographic surface on an with a designated path of travel.

In FIG. 1 a notional surface 10 illustrates the challenge of determining an absolute position R(t) along the surface that is free to translate in one direction with respect to a fixed reference frame 12. This surface has a smoothly varying topology in which the tangent of any one point varies smoothly along the path of motion. The surface may, for example, be planar, spherical or of arbitrary topology. The surface may be the surface of a physical element or device. In the present case, a single direction of motion is displayed by the double arrowed line 14 that follows the contour of the surface. For indications of position on length scales smaller than typical mechanical instruments ($\cong 100\,\mu m$) optical methods become necessary for varied surfaces. It may be desirable to use such optical methods to determine absolute position with a resolution less than approximately 100 µm and to do so without requiring initialization.

Figure 2:
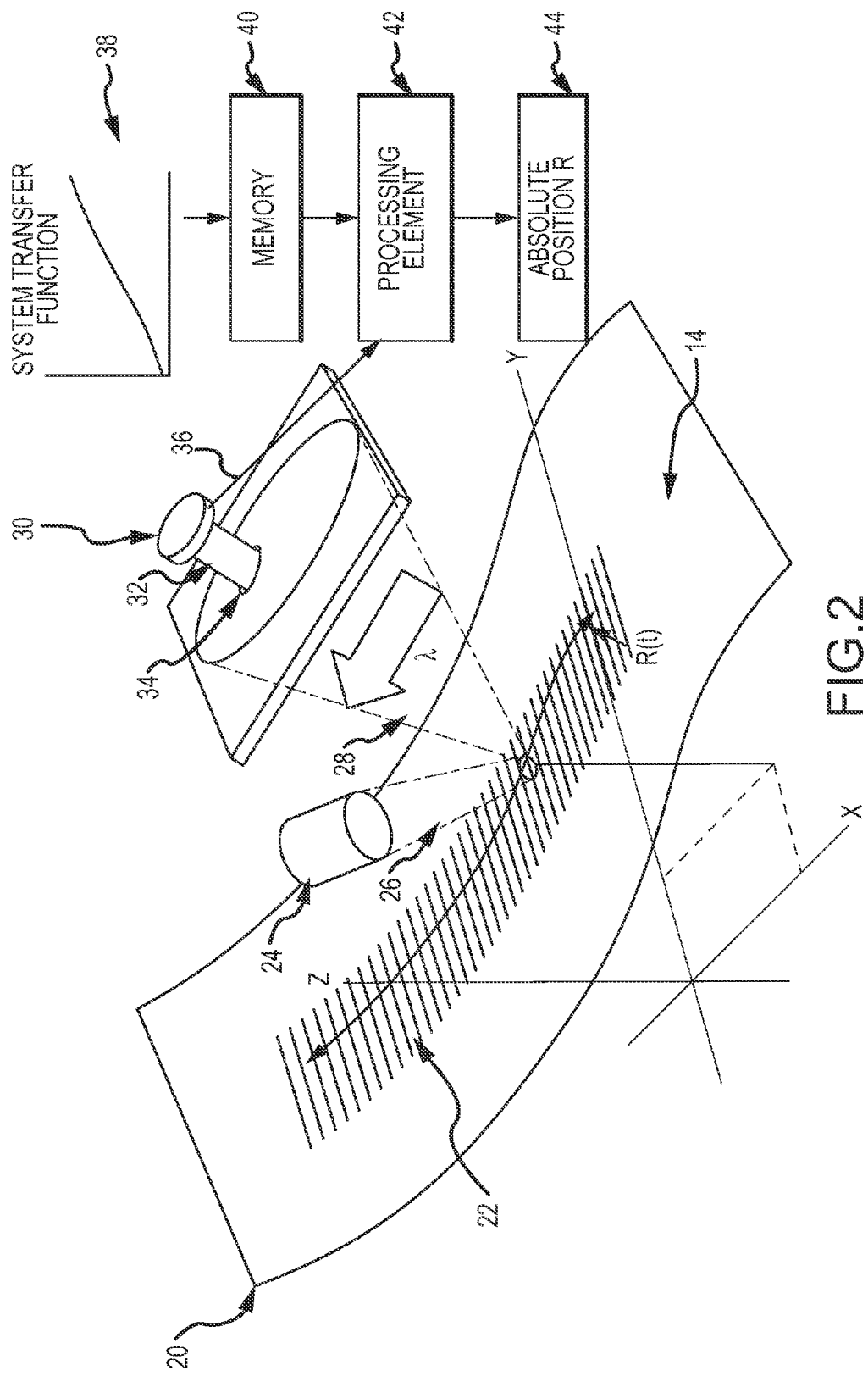
FIG. 2 is a diagram of an absolute position encoder for determining the absolute-position of a location on the topographic surface of the element.

As shown in FIG. 2, an absolute position encoder 20 detects angular dispersion from a target 22 on and positionally-registered to surface 10 along the path of motion 14 to determine an absolute-position on the surface. Either surface 10 or encoder 20 may translate along the path of motion to create relative motion. A multi-spectral light source 24 illuminates a position on topographic surface 10 with light 26 at an angle of incidence determined from a vector normal to the surface. Target 22 comprises a variable grating that diffracts the incident light 26 to form a multi-spectral diffraction pattern 28 in which the wavelengths (colors) are spatially separated in a 'rainbow' across the pattern. A physical parameter of the grating is varied along the path of motion so that the angular dispersion of the diffraction pattern varies with the absolute position R of the incident light along the grating. A chromatically responsive sensor 30 detects a narrow band 32 of the diffraction pattern through an entrance aperture 34 (e.g. a pinhole) positioned at an angle of detection determined from the vector normal to the topographic surface. The target is positioned on the surface along the path of motion such that the incident and diffracted light lie in a plane parallel to the direction of relative motion. The source/sensor unit maintains (within an acceptable noise tolerance) its geometric relationship to the vector normal to the topographic surface at the position of illumination.

Sensor 30 outputs a signal 36 responsive to the change in the angular dispersion of the detected narrow band of the diffraction pattern. A system transfer function 38 of the source, target and sensor for a fixed angle of incidence and fixed angle of detection to the vector normal to the surface, which is stored in memory 40, provides a 1-to-1 mapping of the detected signal to absolute position R on the grating, hence topographic surface. A processing element 42 such as a computer processor uses the system transfer function 38 to map the detected signal 36 to an absolute-position R 44 on the topographic surface.

FIG. 3 depicts the transfer functions of the primary components of the encoder and the construction of system transfer function 38 that relates the detected signal (Tout) to the absolute position (R) on the surface. The multi-spectral source is characterized by a transfer function 50 of intensity as a function of wavelength. As an example, a spectral composition of a white light LED is shown with a particular region of interest 52 (e.g. 430 nm to 730 nm) highlighted. The intensity is modeled by a Maxwell distribution as a function of wavelength $I_{LED}(\lambda(R)) \sim \lambda^2 e^{-\lambda^2}$. The source must be sufficiently broadband to span changes in the angular dispersion over the range of motion and must have sufficient fidelity (resolution) to exceed the resolution of the grating. The grating is characterized by a transfer function 54 of efficiency as a function of wavelength. The efficiency by which the intensity of incident light is diffracted and not scattered for a given wavelength can be measured in the laboratory, or calculated from the parameters an optical design. The polarization state of the diffracted light is known and considered in the efficiency of the diffraction grating. For the purpose here, the efficiency in the region of interest is highlighted and modeled as a linear dependence on wavelength $E(\lambda(R)) \sim \lambda$. The sensor is characterized by a transfer function 56 of spectral response as a function of wavelength. An example of the spectral response of a silicon photo detector is modeled as a linear function of the wavelength $\Re(\lambda(R)) \sim \lambda$ in the region of interest. The system transfer function is a product of the transfer functions of the primary components.

The grating equation establishes the spectral distribution of the light. The grating equation is $m\lambda(R) = d(R) \cdot [\sin \alpha \pm \sin \beta]$ where $\lambda(R)$ is the spectral distribution m is the diffraction order, d is the grating spacing (which may be a function of absolute position R depending on how the variable grating is constructed), α is the angle of incidence and β is the angle of detection with respect to the grating normal. Given the design of the variable grating (i.e., d(R)), system transfer function 38 can be constructed the gives a direct functional relationship between the detected spectral intensity to the physical position illuminated on the target. STF 38 must not be constant and should be monotonic. The slope of the STF determines the sensitivity; the greater the slope, the higher the sensitivity. STF 38 is calculated for specified values of α and β. The encoder maintains a fixed geometry of the source and the sensor relative to the surface so that the angles of incidence and detection do not change. The dynamic range of motion encompasses the free spectral range of the diffracting systems, or takes into account the total illumination of overlapping diffraction orders.

The topology should be "smoothly varying" (if at all) such that the geometric relationship of the source/detector unit to the vector normal to the surface at the point of illumination remains approximately constant. STF 38 is calculated for specified values of α and β. The encoder maintains a fixed geometry of the source and the sensor relative to the surface so that the angles of incidence and detection do not change.

As shown in FIG. 4a, an encoder 60 is configured to measure absolute position on a target 62 on a planar surface 64 that moves along a linear path 66. The vector normal 68 at the point of illumination does not change. The geometric relationship of a source 70 and sensor 72 is fixed at the specified values for the angles of incidence and detection.

As shown in FIG. 4b, an encoder 80 is configured to measure absolute position on a target 82 on a spherical surface 84 that rotates through a path 86 with a fixed radius about a point 87. The vector normal 88 at the point of illumination does not change. The geometric relationship of a source 90 and sensor 92 is fixed at the specified values for the angles of incidence and detection.

Figure 4C:
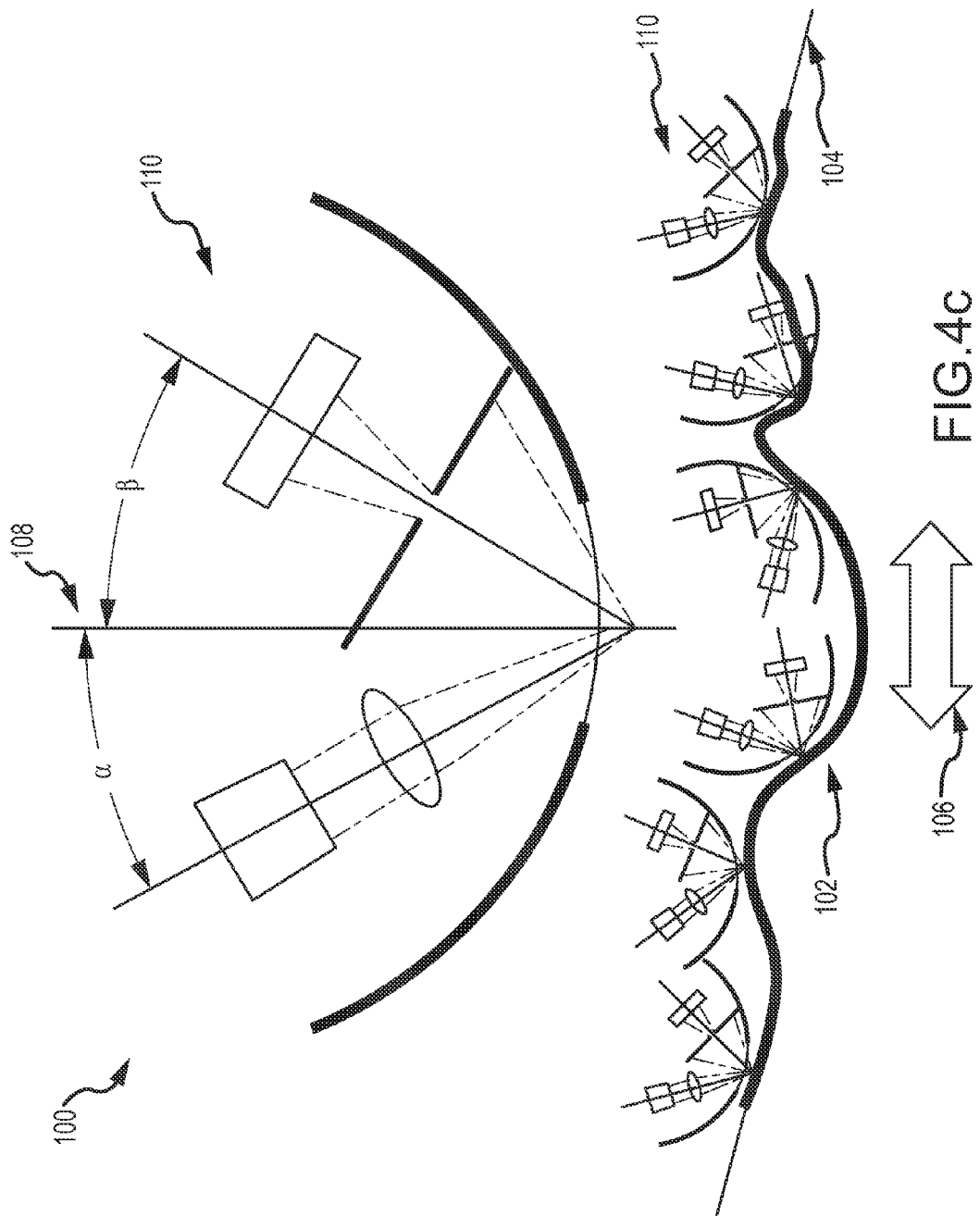

As shown in FIG. 4c, an encoder 100 is configured to measure absolute position on a target 102 on a non-planar surface 104 that moves a long a linear path 106. The vector normal 108 at the point of illumination changes with the local curvature of surface 104. The geometric relationship of a source/sensor unit 110 adapts to changes in the vector normal with relative motion to maintain the approximately constant relationship of the angles of incidence and detection to the vector normal. The source/sensor unit may be mounted on a positioning stage that senses changes in the vector normal and repositions the unit to maintain desired relationship.

As described the "target" comprises a grating on and positionally-registered to the surface along the path of motion. A grating, transmissive or reflective, is characterized by a variation in a physical property such as its geometric or material properties that produces a spatial periodic modulation in the index of refraction that diffracts the incident light to create the multi-spectral diffraction pattern. These geometric or material properties may be controlled to vary the spatial periodic modulation of the index of refraction along the path of motion such that the angular dispersion of the diffraction pattern varies with the absolute position of illumination along the variable grating. The geometric or material properties may be varied in a monotonic, and possibly linear, manner to vary the angular dispersion.

The variation a physical property may be accomplished by varying the surface relief, index of refraction or optical absorption of the optical materials that make up the grating. The first category consists of strictly geometric variability in the surface relief of an optical material. This precisely means the spatial periodic variation between the boundaries of two materials of different indices of refraction. This can be achieved by grooves with cross sectional rectangular (lamellar), triangular (blaze), sinusoidal or trapezoidal profiles. The grating features consist of the periodicity, height, and/or angle of the facets. The second category consists of modulation of phase by a variation in the index of refraction of an optical material. A volume phase holographic grating is an example where the variation in the index of refraction results from periodic fringes within the volume of a thin material. Thin film deposition, or photolithography, of materials of alternating refractive indices is another example. Thus, the spatial periodicity in conjunction with the variation in the index of refraction constitutes the performance of grating. Amplitude gratings are a third category in which the optical absorption (the complex component of the index of refraction) is spatially varied throughout a material. The performance of the grating is determined by the spatial variation of the absorption property of the material. All three categories can produce optical interference by reflection from or transmission through the grating depending on materials and design.

A blazed grating is a "surface relief" type of diffraction grating. Blazed gratings produce maximum efficiency at a specified wavelength; that is, a diffraction grating that is "blazed at 250 nm" will operate most efficiently when light with a wavelength of 250 nm passes through or is reflected off the grating. Like standard diffraction gratings, blazed gratings diffract incoming light using a series of grooves. However, in blazed gratings the grooves have been manufactured such that they form right angles with a specified "blaze angle" to the facet, which is the angular distance from the surface normal of the diffraction plate. The magnitude of the blaze angle determines the wavelength at which the grating will be most efficient. In a variable blaze grating, the "blaze angle" varies along the direction of the grating. This changes the wavelength at which the grating is most efficient, hence the angular dispersion of the diffraction pattern with absolute position along the grating. The grating pitch d (e.g. between groove spacing) may be allowed to vary with blaze angle to main a uniform height across the grating. This also changes the wavelength at which the grating is most efficient. Alternately, the height may be allowed to vary across the grating to maintain uniform pitch d.

Figure 5:
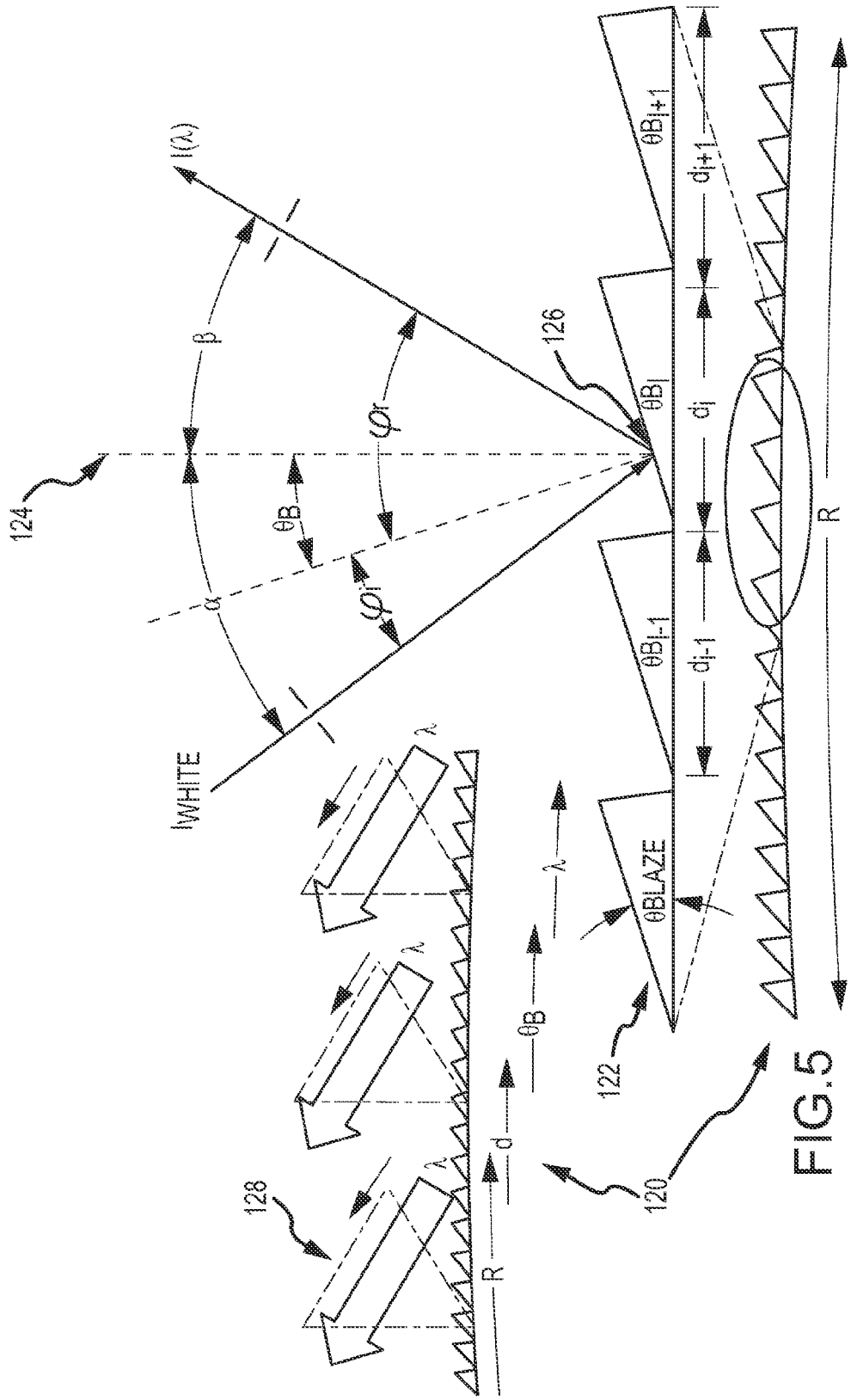
FIG. 5 is a diagram an embodiment of a variable diffraction grating target comprising a variable blazed grating having facets with a consistent variation of blaze angle (and pitch) over the grating surface.

FIG. 5 illustrates an embodiment of a variable blazed grating 120 in which both the blaze angle $\Theta_B(i)$ and the corresponding pitch d(i) of grooves 122 vary with index I along the path of motion of the target surface. The angle of incidence α of the source light ($I_{white}$) to the grating normal 124 and the angle of detection β to the grating normal 124 remain constant. The angle of incidence $\phi_i$ with respect to the blaze facet of groove 122 and $\phi_r$ is the angle of reflection from the blaze facet representing the superposition of all the reflections from neighboring grooves that together produce diffraction. As the point of illumination 126, which typically covers multiple grooves 122, traverses the surface of the target (from left to right) the angle of diffraction for any given wavelength and order (m) decreases accordingly with increasing blaze angle ($\theta_B$) and grating pitch (d). In an embodiment, the angle of detection β may be a nominal value for the angle of diffraction. As the point of illumination traverses the surface of the target the angle of diffraction moves through the angle of detection. As such, for a configuration of the devices that optimally utilizes the efficiency of the grating design, the wavelength increases as the point of illumination moves from left to right. Therefore as the blaze angle $\theta_B$ changes, and thus, the associated grating spacing (d), with absolute position R so does the angular dispersion of the diffraction pattern I(λ) 128 in which the wavelengths (colors) are spatially separated in a 'rainbow' across the pattern. The angular dispersion is the composition of the diffraction pattern.

Figure 6:
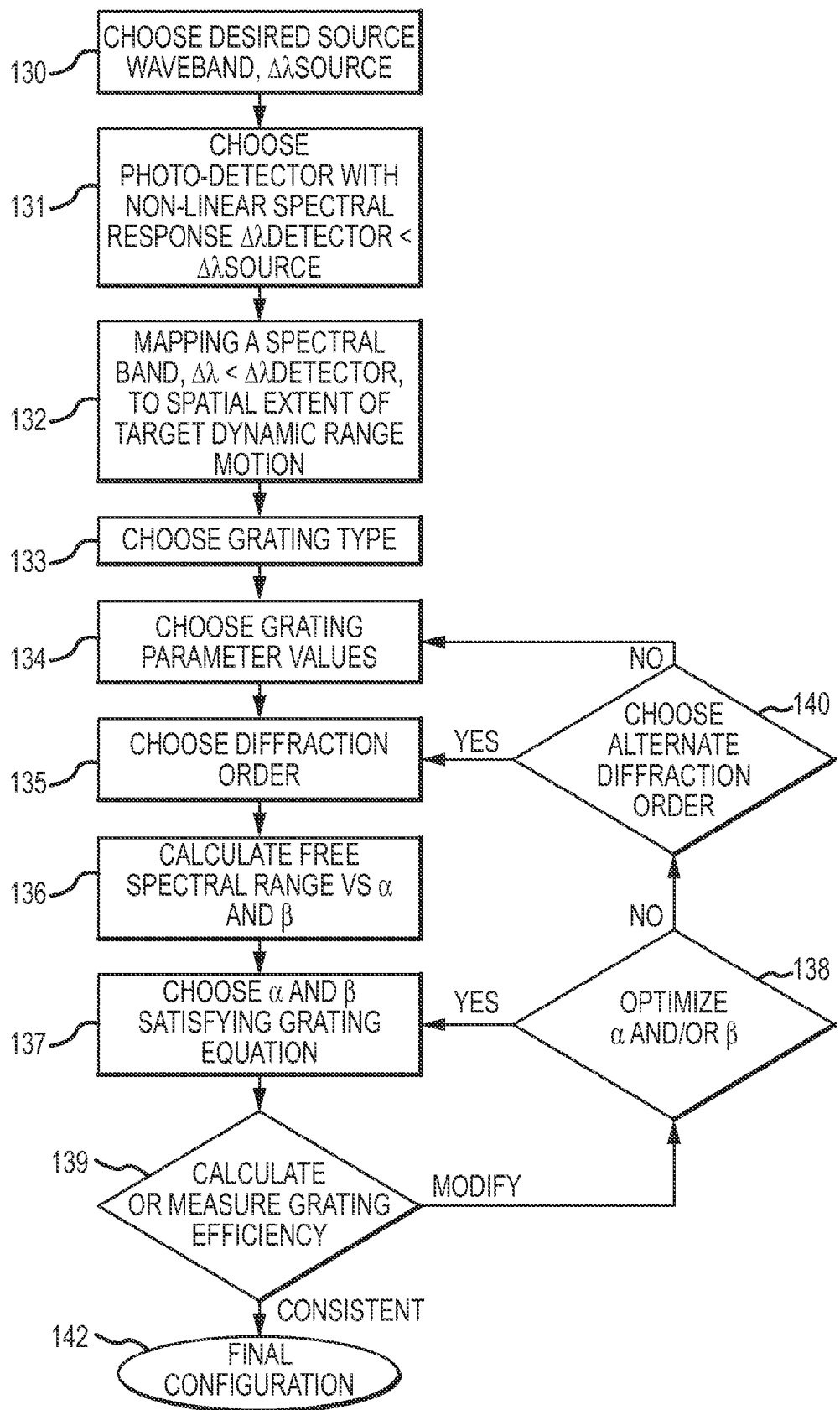
FIG. 6 is a flow diagram for designing a variable diffraction grating for the absolute position encoder.
Figure 7:
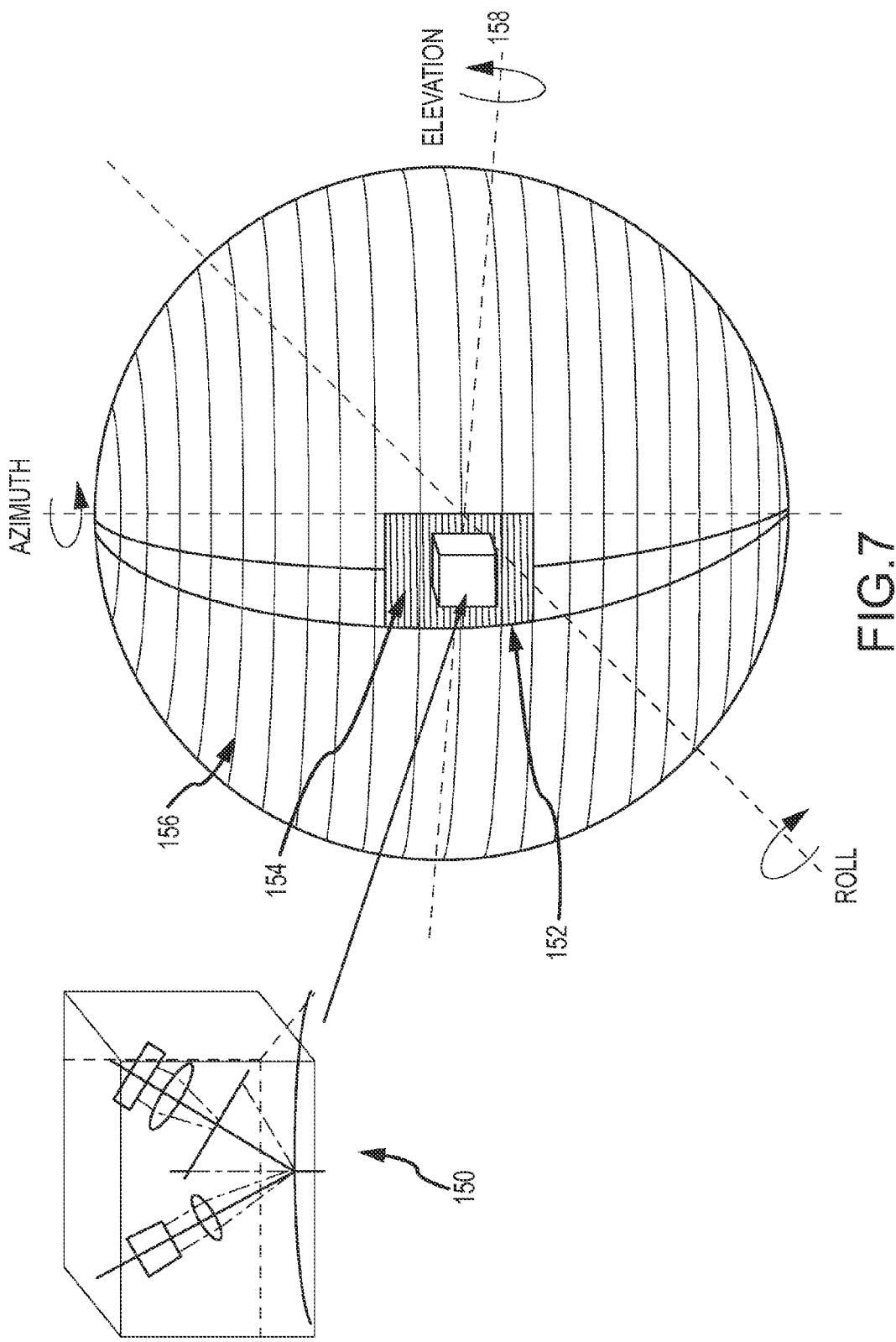
FIG. 7 is a diagram of an embodiment of a grating in a 1-axis system in which the grating features of the target are aligned with longitudinal locations of the spherical topographic surface to measure the absolute angular position about the axis of elevation.

FIG. 6 outlines an embodiment of a method for configuring the encoder and variable grating. The choice of the illuminating waveband of the source (Δλsource) (step 130) and the spectral range of response of a detector (Δλdetector<Δλsource) (step 131) is a consideration of spatial extent of the target to be tracked. As the range of dynamic motion decreases grating features and/or the wavelength of operation necessarily must decrease to achieve a given level of precision. Conversely, this criteria is relaxed for larger ranges of dynamic motion. A spectral band of operation (Δλ<Δλdetector) is mapped to the target's dynamic range of motion (i.e., range of travel) such that the full range over Δλ can be measured (step 132). A type of diffraction grating to be used as the target is a consideration of technologies available for fabrication and/or the economic constraints of the design (step 133). An initial set of grating parametric values can then be chosen (step 134) along with the order of diffraction (step 135). Due to overlapping diffraction for different orders satisfying the grating equation, the calculation of the free spectral range allows for selecting the source and detector orientations (alpha and beta) to optimize the desired performance (steps 136, 137 and 138). The angles of incidence and detection (reflection or transmission), are stationary parameters in the final design. The final consideration is the efficiency of the diffraction order to disperse the wavelengths within the band of operation. The grating efficiency can be measured for any fabricated grating or calculated for a specific design, and necessarily consistent with the chosen parameters measured above (step 139). Any or all of steps (134,135, 137) may be iterated one or more times to improve the design. For example, one may choose an alternate diffraction order (step 140) or choose different grating parameter values (step 134). The final configuration 142 of the encoder is defined by a set of parameters that may include:

1) Spectral output of the source
2) Spectral range of response of photo-detector
3) Non-linear spectral response of photo-detector
4) Base periodicity of grating parameter
5) Step size of variation to grating parameter per period
6) Angle of incidence (alpha) of the source
7) Angle of diffraction (beta) of the photo-detector
8) Efficiency curve of the variable grating
9) Diffraction order of the variable grating FIG. 7 is a diagram of an embodiment of an encoding unit 150 and its grating 152 in a 1-axis system in which the grating features 154 (e.g. grooves) of the target are aligned with longitudinal locations of a spherical topographic surface 156 to measure the absolute angular position about the axis of elevation 158. As surface 156 rotates about axis of elevation 158 the point of illumination follows a path orthogonal to grating features 154. As the radius of the sphere becomes small the conformance of the grating groves to the contour of the surface becomes an important consideration. Thus, to maintain parallelism of the grating features 154 in the azmuthal direction, the grating features 154 must conform to segments of equatorial circles.

The encoder may be configured to measure absolute-position on the surface for multiple degrees of freedom of coupled relative motion. For example, an "eyeball" can be rotated about any of three different axes at the same time. A source/sensor unit and target are provided for each of the degrees of freedom. In a "coupled" system, the absolute position for a given degree of freedom is represented by the combined outputs of the multiple sensors. The processing element(s) apply known techniques to the detected signals to measure the absolute position for each degree of freedom. In a "decoupled" system, each source/sensor unit and target operates independently and outputs the absolute position for a particular degree of freedom. This can be achieved either by positioning the gratings co-orthogonal to one another and orthogonal to their respective degrees of freedom or by shaping the grating features so that motion along the measured degree of freedom remains orthogonal to the grating.

Figure 8:
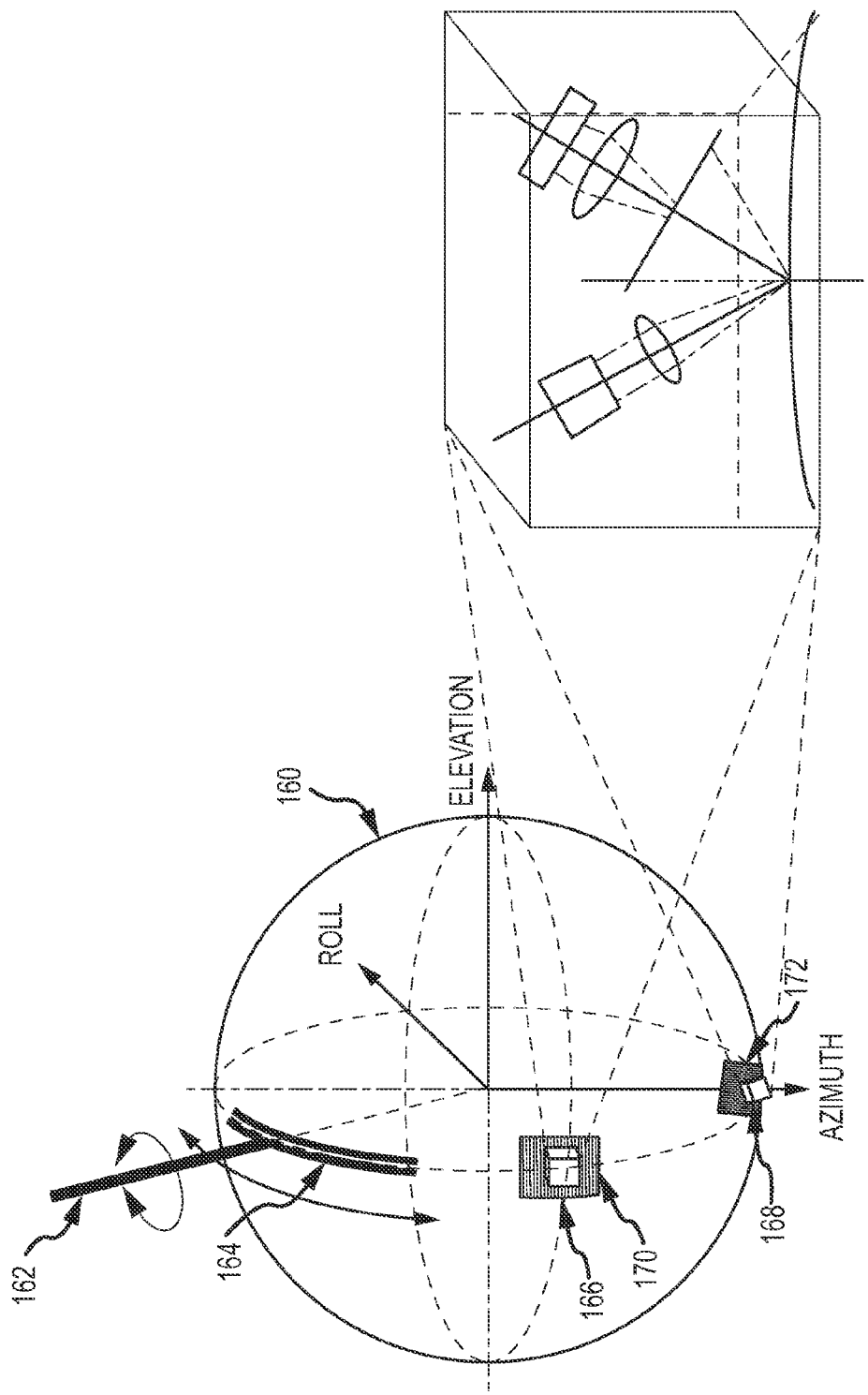
FIG. 8 is a diagram of an embodiment of a 2-axis decoupled system with the roll axis constrained by a pin and slot configuration in which the elevation and azimuth locations are detected by two encoders with elevation measured along the equator of the sphere and azimuth measured along the longitudinal circle perpendicular to the pin axis.
Figure 9:
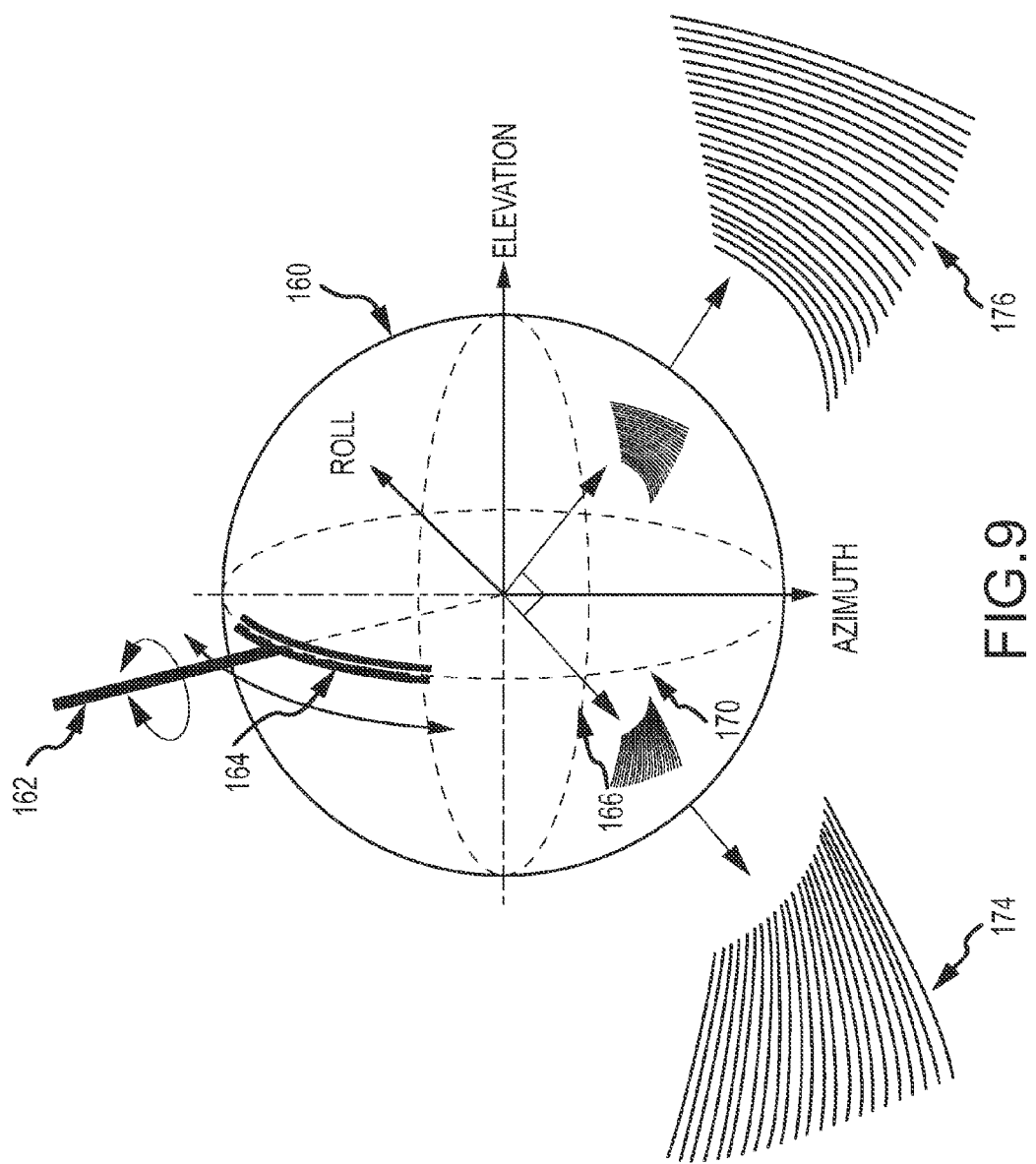
FIG. 9 is a diagram of an embodiment of a 2-axis decoupled system with the roll axis constrained by a pin and slot configuration in which the target locations are orthogonal to each other and the constraining pin such that mapping of the target gradient geometries with respect to the pin axis deconvolves conforming iso-elevation and iso-azimuth lines along the direction of motion.

In FIGS. 8 and 9 the roll axis of a sphere 160 is constrained by a pin 162 and slot 164 design that provides for rotation in two degrees of freedom about the azimuth and elevation axis. Rotation about the azimuth axis is unconstrained while rotation about the elevation axis is constrained by the length of slot 164. In the frame of reference of an observer, rotation in elevation follows along the direction of the slot and rotation in azimuth is about the pin. Thus, indication of angular orientation of the sphere requires information on two degrees of freedom, necessitating the use of two encoding units 166 and 168.

In the embodiment shown in FIG. 8, one target 170 is located on the equator of the sphere for detection of elevation and a second target 172 is located along the longitudinal line containing the pin and the first target. These targets 170 and 172 are effectively decoupled and readout the absolute rotation angle about the elevation and azimuth axes, respectively.

In the embodiment shown in FIG. 9, targets 174 and 176 are placed orthogonal to one another as referenced from the center of the sphere. The source/sensor units are not shown. The grating features of target 174 are shaped to provide an "iso-elevation" target so that rotation around the elevation axis remains orthogonal to the grating. The grating features of target 176 are shaped to provide an "iso-azimuth" target so that rotation around the azimuth axis remains orthogonal to the grating.

Figure 10:
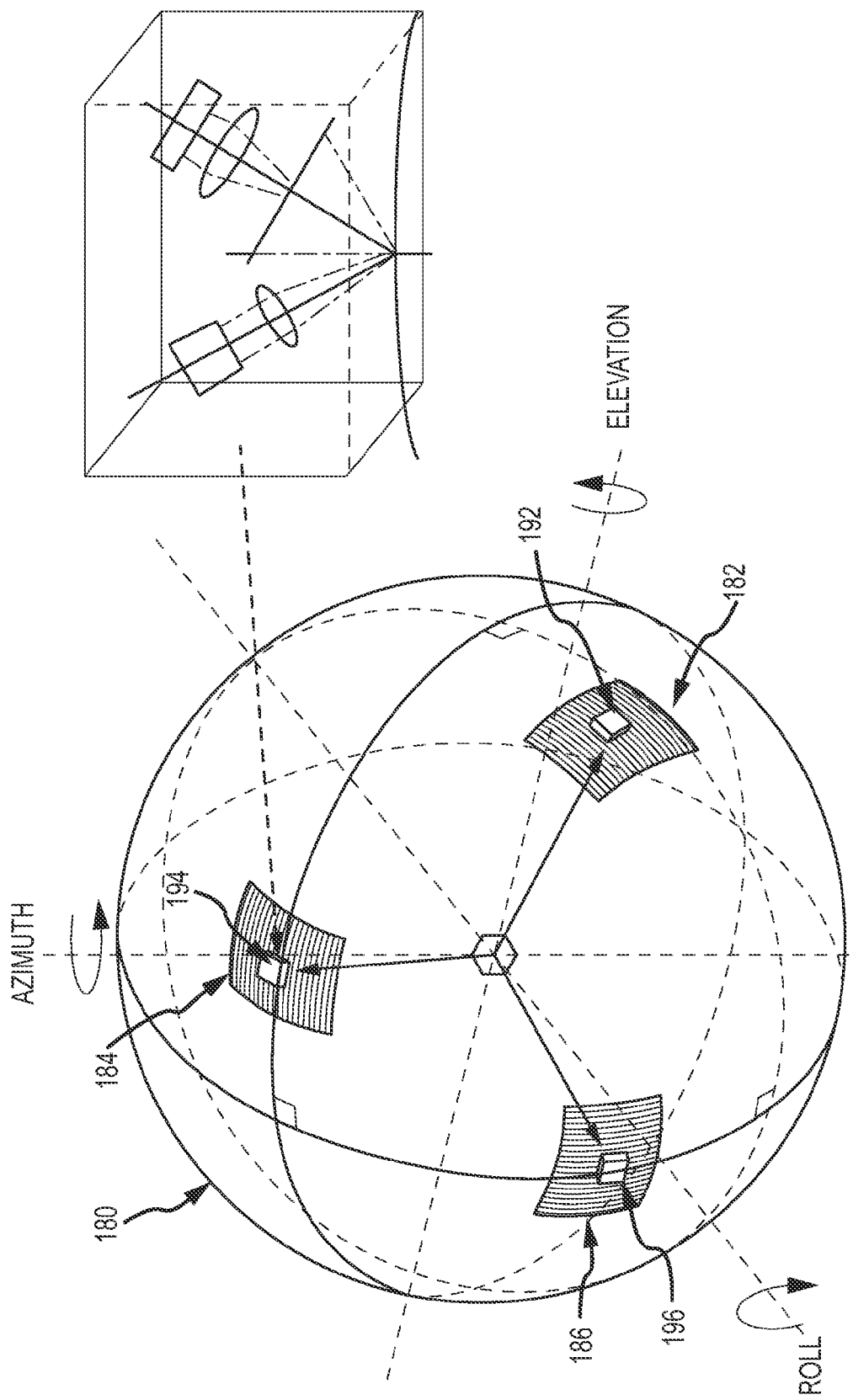
FIG. 10 is a diagram of an embodiment of 3-axis decoupled system in which the targets are orthogonally placed for encoding of all three degrees of rotation in an unconstrained system.

FIG. 10 depicts a three dimensional case where all three axes of rotation of a sphere 180 are unconstrained. Three targets 182, 184 and 186 are positioned on the surface, co-orthogonal to one another. The grooves of each grating conform to latitudinal circles on the sphere. Corresponding source/sensor units 192, 194 and 196 are positioned with a fixed geometric relationship to the sphere to readout absolute rotation angles about the elevation, azimuth and roll axes, respectively. As long as the rotation of the sphere stays within its defined range of motion about each axes, the encoders may simultaneously and independently readout their absolute angles as sphere 180 undergoes coupled rotation about one or more of the axes.

Two or more additional sensors can be incorporated into the encoder for direction of motion sensing to improve the sensitivity of the absolute position measurement. FIGS. 11*a* and 11*b* illustrate the concept with a linear array of sensors 200, each with an identical narrow band pass filter 202 that allows a signal to be detected by each but offset in phase as determined by the spacing of the sensors. Thus, the measure of phase between neighboring sensors in once period of sampling determines the direction of motion. Considering the rise of the leading edge, and fall of the neighboring edge, the resolution can be increased by 4x. The filter bandwidth is centered at the peak wavelength of the spectral response of the sensor for maximum SNR of the signal. Each sensor has a pin-hole aperture 204 and functions as noted previously in the single sensor configurations. A different narrowband portion of the diffraction pattern 206 in which the wavelengths (colors) are spatially separated in a 'rainbow' across the pattern is incident on each sensor 200. As a combination, the phase quadrature reading from each pair of sensors provides an increase in the sensitivity and direction of motion.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An absolute position encoder, comprising:
    a multi-spectral light source that illuminates a position on a topographic surface at an angle of incidence determined from a vector normal to the surface;
    a target on, and positionally-registered to, the topographic surface, said target comprising a variable grating that diffracts the incident light to form a multi-spectral diffraction pattern in which the angular dispersion of the diffraction pattern varies with the absolute position of the incident light along the grating;
    a chromatically responsive sensor that detects a narrow band of the diffraction pattern transmitted through an entrance aperture positioned at an angle of detection determined from the vector normal to the surface and outputs a signal responsive to the change in the angular dispersion of the detected narrow band of the diffraction pattern; and
    a processing element that maps the detected signal to the absolute-position of illumination by the source on the topographic surface.

2. The encoder of claim 1, wherein the source illuminates the topographic surface with sufficient bandwidth to cover the variance in angular dispersion over a range of relative motion with respect to the target with resolution greater than that of the variable grating.

3. The encoder of claim 1, wherein the variable grating comprises a physical property that varies monotonically to vary the angular dispersion monotonically.

4. The encoder of claim 3, wherein the physical property is one of surface relief, index of refraction and optical absorption.

5. The encoder of claim 1, wherein the grating comprises a blazed grating with a monotonically varying blaze angle.

6. The encoder of claim 1, wherein the sensor comprises a pinhole that defines the entrance aperture to a photodetector.

7. The encoder of claim 1, wherein the sensor comprises a linear array of detectors that output respective signals, said processing element supplementing the measurement of one said detector by a phase quadrature measurement from each pair of said detectors.

8. The encoder of claim 1, wherein said source, target and sensor define a monotonic system transfer function that maps the detected signal to absolute position on the topographic surface for a fixed angle of incidence and fixed angle of detection, said angles of incidence and detection remaining approximately constant at the fixed angle of incidence and fixed angle of detection, respectively, over a range of relative motion with respect to the target.

9. An absolute position encoder, comprising:
    a plurality of N encoder units, each said encoder unit comprising:
        a multi-spectral light source that illuminates a position on a topographic surface at an angle of incidence determined from a vector normal to the surface;
        a target on, and positionally-registered to, the topographic surface, said target comprising a variable grating that diffracts the incident light to form a multi-spectral diffraction pattern in which the angular dispersion of the diffraction pattern varies with the absolute position of the incident light along the grating;
        a chromatically responsive sensor that detects a narrow band of the diffraction pattern transmitted through an entrance aperture positioned at an angle of detection determined from the vector normal to the surface and outputs a signal responsive to the change in the angular dispersion of the detected narrow band of the diffraction pattern; and
    one or more processing elements that map the detected signals to the absolute-positions of illumination by the sources on the topographic surface along N different degrees of freedom.

10. The encoder of claim 9, wherein said encoder units are decoupled, each said encoder unit comprising said processing element that maps the detected signal to the absolute-position along one of said N degrees of freedom.

11. The encoder of claim 10, wherein within each said encoder unit the grating is shaped with conformal lines so that relative motion along the measured degree of freedom remains orthogonal to the grating.

12. The encoder of claim 9, wherein within each said encoder unit the variable grating comprises a physical property that varies monotonically to vary the angular dispersion monotonically.

13. The encoder of claim 9, wherein within each said decoder unit said source, target and sensor define a monotonic system transfer function that maps the detected signal to absolute position on the topographic surface for a fixed angle of incidence and fixed angle of detection, said angles of incidence and detection remaining approximately constant at the fixed angle of incidence and fixed angle of detection, respectively, over a range of relative motion along one said degree of freedom with respect to the target.

14. An absolute position encoder, comprising:
a spherical topographic surface comprising a pin slide through a slot that allows the surface to move in a first degree of freedom along the slot and in a second degree of freedom rotating about the pin;
a first encoding unit configured to measure absolute position along the first degree of freedom, said unit comprising:
a multi-spectral light source that illuminates a position on the spherical topographic surface at an angle of incidence determined from a vector normal to the surface;
a target on, and positionally-registered to, the topographic surface, said target comprising a variable grating that diffracts the incident light to form a multi-spectral diffraction pattern in which the angular dispersion of the diffraction pattern varies with the absolute position of the incident light along the grating;
a chromatically responsive sensor that detects a narrow band of the diffraction pattern transmitted through an entrance aperture positioned at an angle of detection determined from the vector normal to the surface and outputs a signal responsive to the change in the angular dispersion of the detected narrow band of the diffraction pattern; and
a processing element that maps the detected signal to the absolute-position of illumination by the source on the topographic surface along the first degrees of freedom; and
a second encoding unit configured to measure absolute position along the second degree of freedom, said unit comprising:
a multi-spectral light source that illuminates a position on the spherical topographic surface at an angle of incidence determined from a vector normal to the surface;
a target on, and positionally-registered to, the topographic surface, said target comprising a variable grating that diffracts the incident light to form a multi-spectral diffraction pattern in which the angular dispersion of the diffraction pattern varies with the absolute position of the incident light along the grating;
a chromatically responsive sensor that detects a narrow band of the diffraction pattern transmitted through an entrance aperture positioned at an angle of detection determined from the vector normal to the surface and outputs a signal responsive to the change in the angular dispersion of the detected narrow band of the diffraction pattern; and
a processing element that maps the detected signal to the absolute-position of illumination by the source on the topographic surface along the second degree of freedom.

15. The encoder of claim 14, wherein said first and second encoding units' gratings are positioned are positioned co-orthogonal to each other and orthogonal to their respective measured degree of freedom.

16. The encoder of claim 14, wherein said first and second encoding units' gratings are shaped so that motion along the respective measured degrees of freedom remains orthogonal to the grating.

17. The encoder of claim 14, wherein within each said encoder unit the variable grating comprises a physical property that varies monotonically to vary the angular dispersion monotonically.

18. The encoder of claim 14, wherein within each said decoder unit said source, target and sensor define a monotonic system transfer function that maps the detected signal to absolute position on the topographic surface for a fixed angle of incidence and fixed angle of detection, said angles of incidence and detection remaining approximately constant at the fixed angle of incidence and fixed angle of detection, respectively, over a range of relative motion along one said degree of freedom with respect to the target.

* * * * *